(12) United States Patent  
Davey et al.

(10) Patent No.: US 6,581,311 B1
(45) Date of Patent: Jun. 24, 2003

(54) CLIP ASSEMBLY FOR AN AUTOMOTIVE VEHICLE

(75) Inventors: Geoffrey William Davey, Huntington Woods, MI (US); Erik Richard Davis, Oak Park, MI (US); Terry Lynn Brandl, Marine City, MI (US)

(73) Assignee: Magna Interior Systems, Inc., Aurora (CA)

( * ) Notice: Subject to any disclaimer, the term of this patent is extended or adjusted under 35 U.S.C. 154(b) by 0 days.

(21) Appl. No.: 10/048,504

(22) PCT Filed: Aug. 4, 2000

(86) PCT No.: PCT/CA00/00905

§ 371 (c)(1),
(2), (4) Date: Jan. 30, 2002

(87) PCT Pub. No.: WO01/10681

PCT Pub. Date: Feb. 15, 2001

Related U.S. Application Data

(60) Provisional application No. 60/147,245, filed on Aug. 5, 1999.

(51) Int. Cl.$^7$ .............................................. G09F 21/04
(52) U.S. Cl. ............................. 40/593; 40/668; 296/214
(58) Field of Search .......................... 40/593, 662, 663, 40/668, 622; 280/728.1; 296/214

(56) References Cited

U.S. PATENT DOCUMENTS

| | | | | |
|---|---|---|---|---|
| 1,660,117 A | * | 2/1928 | Brooks | 40/662 |
| 1,669,998 A | * | 5/1928 | O'Hara | 40/662 |
| 1,737,375 A | * | 11/1929 | King | 40/662 |
| 1,930,783 A | * | 10/1933 | Watson et al. | 40/631 |
| 3,009,381 A | * | 11/1961 | Rapata | 40/668 |
| 4,422,276 A | | 12/1983 | Paravano | |
| 5,487,557 A | | 1/1996 | Eckhout | |
| 5,529,336 A | | 6/1996 | Eckhout | |
| 5,672,038 A | | 9/1997 | Eaton | |
| 5,678,851 A | | 10/1997 | Saito et al. | |
| 5,683,101 A | | 11/1997 | Davis et al. | |
| 5,685,056 A | | 11/1997 | Fischer | |
| 5,718,025 A | | 2/1998 | Courtin | |
| 5,775,721 A | | 7/1998 | Grout | |
| 5,800,109 A | | 9/1998 | Carruthers | |
| 5,851,022 A | | 12/1998 | Yamamoto et al. | |
| 5,906,465 A | | 5/1999 | Sato et al. | |
| 5,907,891 A | | 6/1999 | Meyer | |
| 6,099,027 A | * | 8/2000 | Shirk et al. | 40/593 |

FOREIGN PATENT DOCUMENTS

| | | |
|---|---|---|
| DE | 43 24 736 C1 | 10/1994 |
| FR | 2 095 439 | 2/1972 |
| FR | 2 561 726 A | 9/1985 |
| FR | 2 734 774 | 12/1996 |
| GB | 2 300 159 A | 10/1996 |

\* cited by examiner

Primary Examiner—Gary Hoge
(74) Attorney, Agent, or Firm—Rader, Fishman & Grauer PLLC

(57) ABSTRACT

A clip assembly presents indicia on an interior panel of a vehicle. The clip assembly has a face plate having indicia thereon and a base for mounting the clip assembly to the interior panel. The face plate has at least two barbed posts. The base has a contour which is asymmetrical in at least one direction. The base engages with a complementarily shaped recess on the interior panel such that the base is received therein in only one orientation. The base has at least two complementary apertures receiving the posts. The apertures and the posts are constructed and arranged such that the face plate engages the base through the interior panel in only one orientation relative thereto, enabling the face plate to be attached to the interior panel presenting the indicia in a predetermined readable orientation.

15 Claims, 3 Drawing Sheets

CLIP ASSEMBLY FOR AN AUTOMOTIVE VEHICLE

This application claims the benefit of provisional application Ser. No. 60/147,245 filed Aug. 5, 1999.

FIELD OF INVENTION

The subject invention relates to a clip, badge or emblem having indicia thereon, which clip, badge or emblem is integrally mounted within an automotive vehicle.

BACKGROUND OF THE INVENTION

Airbags are placed within the interior of a vehicle to provide added protection to an occupant. The automobile manufacturer frequently requires that a message, such as "SRS" and/or "AIRBAG", be placed within the interior of the vehicle over the position of the airbag to alert the occupant to the location of the airbag. These airbag messages may be integrally molded into the interior of the vehicle. Some interior components, however, do not allow for an integrally molded message, i.e. headliners. An emblem is typically attached to these components. The emblem is either a heat transfer label or a pressure sensitive adhesive label. Both of these types of emblems require specialized equipment and may detach from the component upon deployment of the airbag.

A simple badge or clip could be provided. The badge or clip will have imprinted or molded thereon the requisite indicia. However, prior art clips are generally symmetrical about both the longitudinal and transverse axes. As a result, such clips or badges may be installed with the indicia inverted, a result which is highly undesirable.

SUMMARY OF INVENTION

The disadvantages of the prior art may be overcome by providing a clip assembly which is mounted in a predetermined orientation to an interior panel of a vehicle. The clip assembly has a face plate having indicia thereon and a base for mounting the clip assembly to the interior panel. The face plate has at least two barbed posts. The base has a contour which is asymmetrical in at least one direction. The base engages with a complementarily shaped recess on the interior panel such that the base is received therein in only one orientation. The base has at least two complementary apertures receiving the posts. The apertures and the posts are constructed and arranged such that the face plate engages the base through the interior panel in only one orientation relative thereto, enabling the face plate to be attached to the interior panel presenting the indicia in the predetermined readable orientation.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
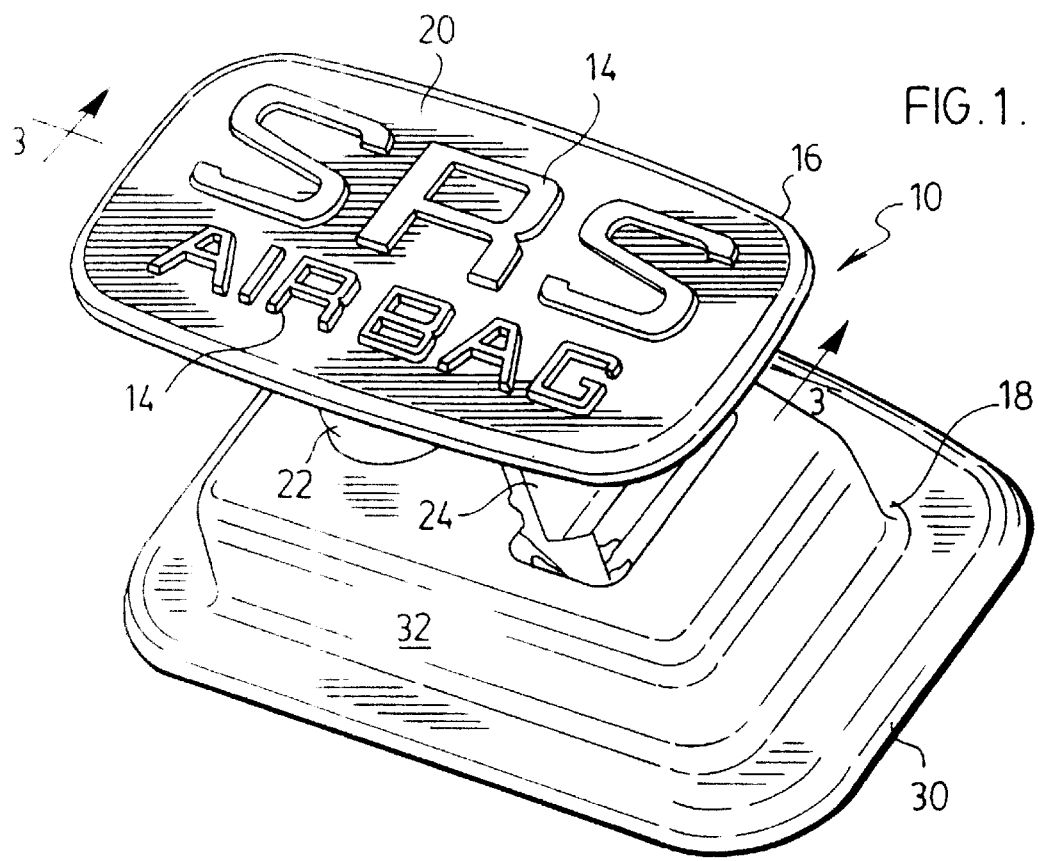
FIG. 1 is a perspective view of a clip assembly in accordance with the subject invention.

Referring to the Figures, wherein like numerals indicate like or corresponding parts throughout the several views, a clip assembly for an automotive vehicle (not shown) is generally shown at 10. The clip assembly 10 preferably mounts to an interior vehicle trim cover 12 such as a headliner. The clip assembly 10 is preferably positioned within the interior of the vehicle near the location of an airbag restraint system (not shown). The clip assembly 10 includes some type of indicia 14, such as "SRS AIRBAG", to alert an occupant of the location of the airbag. During deployment of the airbag, the clip assembly 10 remains attached to the interior component, i.e., the headliner, of the vehicle in order to reduce the likelihood of injury to the occupant.

The clip assembly 10 includes a face plate 16 and a base 18. The base 18 preferably abuts an outer surface of the trim cover 12 and the face plate 16 abuts an inner surface of the trim cover 12 such that the trim cover 12 is sandwiched between the plate 16 and base 18.

References to "inner" and "outer" refer to relative positioning within a vehicle. "Inner" refers to the interior of the vehicle.

The face plate 16 has two inwardly projecting posts 22, 24. Each of the posts 22, 24 has a tapered leading edge 26 and a plurality of biased barbs 28 extending therefrom. The barbs 28 are biased to allow insertion and prevent removal of the posts 22, 24. Preferably, each post 22, 24 has a different cross-sectional configuration which ensures proper positioning and mounting of the plate 16 relative to the base 18. Preferably, one of the posts 22, 24 has a circular configuration and the other of posts 22, 24 has a rectangular configuration.

The inner surface 20 includes indicia 14 which is illustrated as raised lettering. The indicia 14 may be recessed lettering, a decal, imprinted, painted or otherwise placed upon the inner surface 20 without deviating from the scope of the subject invention.

Figure 2:
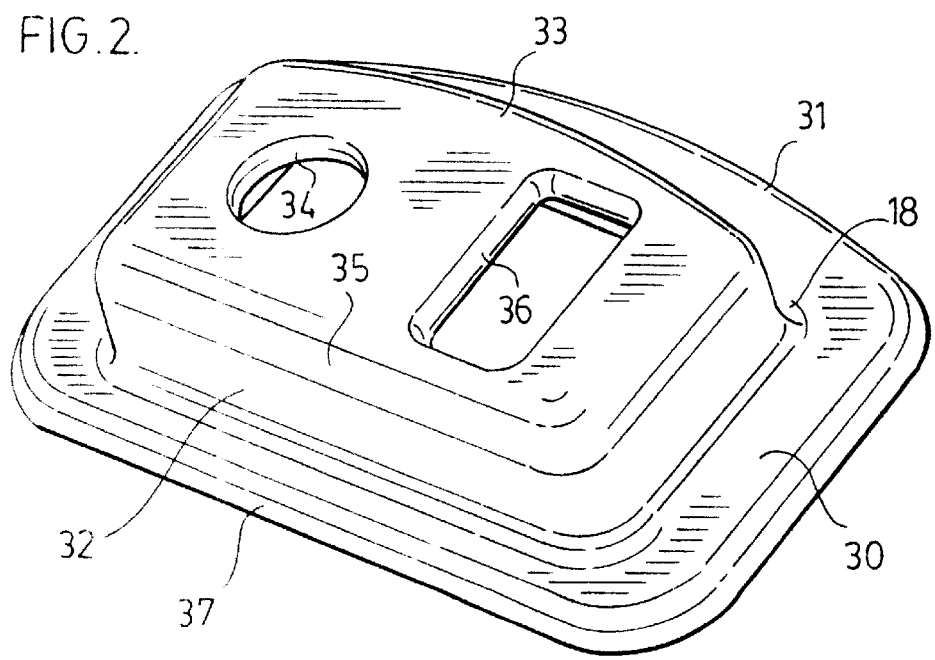
FIG. 2 is a perspective view of a base of the clip assembly.
Figure 3:
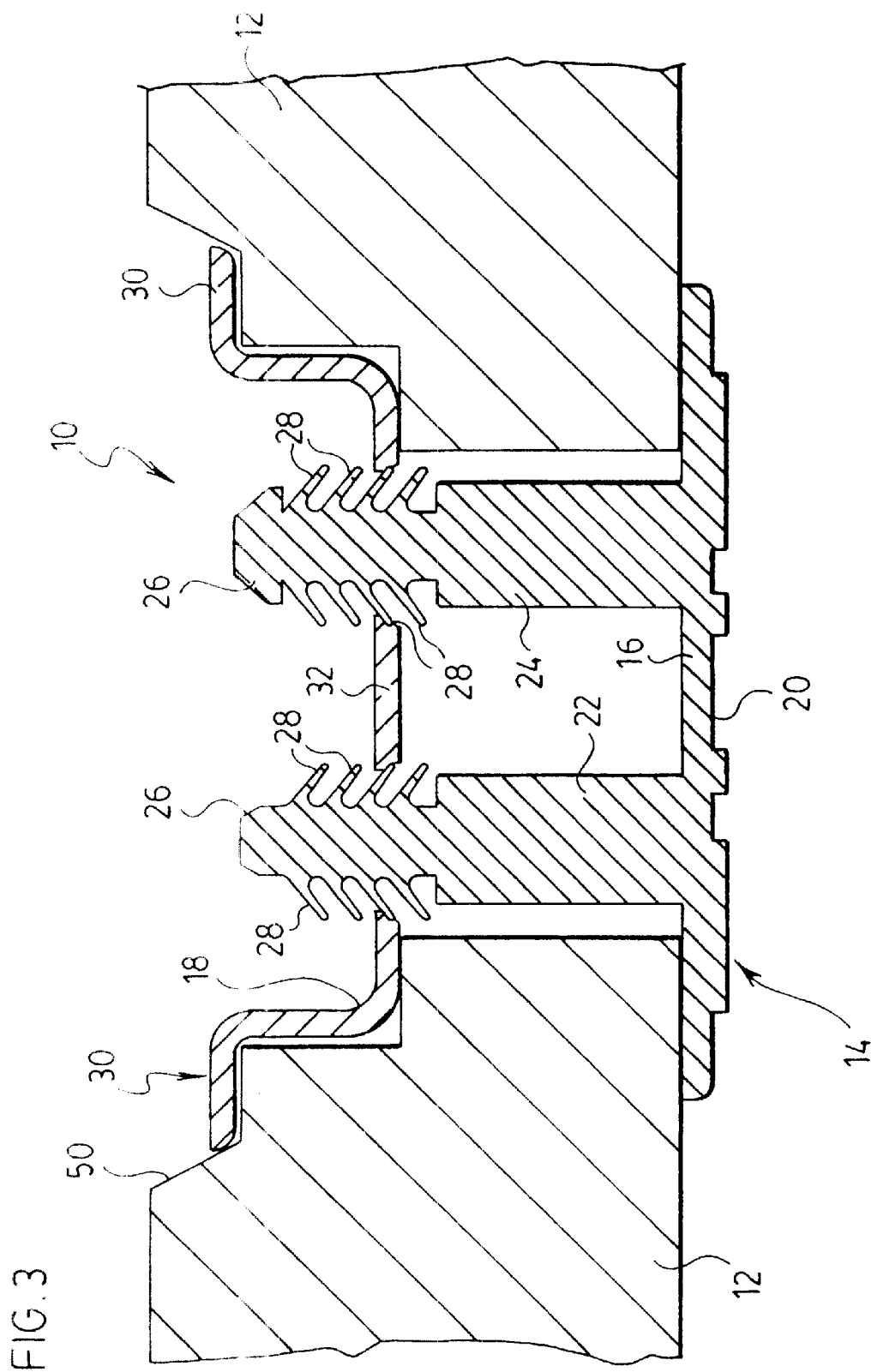
FIG. 3 is a cross-sectional view of the clip assembly taken along line 3—3 of FIG. 1.

The base 18, which is best shown in FIGS. 2 and 3, has a main body 32 with an outwardly extending peripheral flange 30. The body 32 preferably has two contoured apertures 34, 36 for receiving and retaining the two complementary posts 22, 24. Specifically, he base 18 has a circular aperture 34 and a rectangular aperture 36 corresponding to the circular post 22 and rectangular post 24. The apertures 34, 36 may also have a tapered leading edge (not numbered) which provides efficient insertion of the posts 22, 24. As appreciated, the apertures 34, 36 may be of any suitable design which correspond to the shape of the posts 22, 24.

The base 18 is contoured to have at least one extent, either longitudinal or transverse, which is asymmetrical. In the embodiment illustrated in FIGS. 1 and 2, longitudinal edge 33 of the main body 32 and longitudinal edge 31 of the flange are arcuate, whereas the opposite edges 35 and 37 are straight.

Preferably, face plate 16 and base 18 are injection molded using a plastic material.

To install the clip assembly 10, a recess 50 is cut or formed into the trim cover 12. The recess 50 is complementary to the shaping of the base 18. By being complementary in shape, base 18 may only be inserted into the recess 50 in one orientation. In normal manufacturing processes for the trim cover, the formation of the recess is performed under computer control. Thus, the recess 50 will always have the correct orientation. The main body 32 of the base 18 is then oriented within the recess 50. An installer aligns the circular post 22 and rectangular post 24 of the face plate 16 with the circular aperture 34 and rectangular aperture 36, respectfully. The rectangular post 24 cannot fit within the circular aperture 34. Hence, the plate 16 has only one orientation relative to the base 18. The installer pushes on the plate 16 to snap fit the clip assembly 10 together until the plate 16 abuts the inner surface of the trim cover material 12. The pushing of the plate 16 drives the posts 22, 24 into biased engagement with the base 18. Specifically, the barbs 28 of each post 22, 24 engages each corresponding aperture 34, 36 to secure the plate 16 to the base 18. The plate 16 and base 18 are now locked into position with the trim cover 12.

Figure 4:
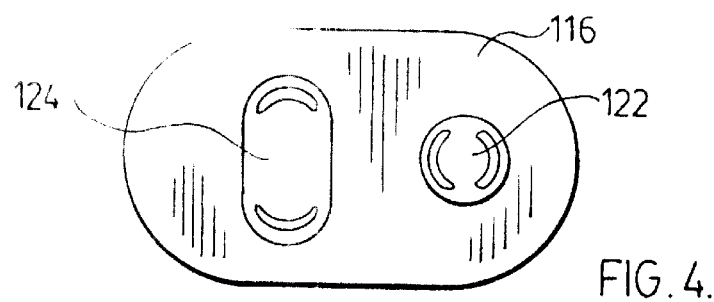
FIG. 4 is a bottom view of a face plate of a second embodiment of the clip assembly of the present invention.

Referring to FIG. 4, an alternate embodiment of the face plate is illustrated. Face plate 116 has at least two pairs of posts 122, 124 with outwardly extending barbs. The posts 122, 124 are arranged such that it can be attached to the base 18 in only one orientation.

Figure 5:
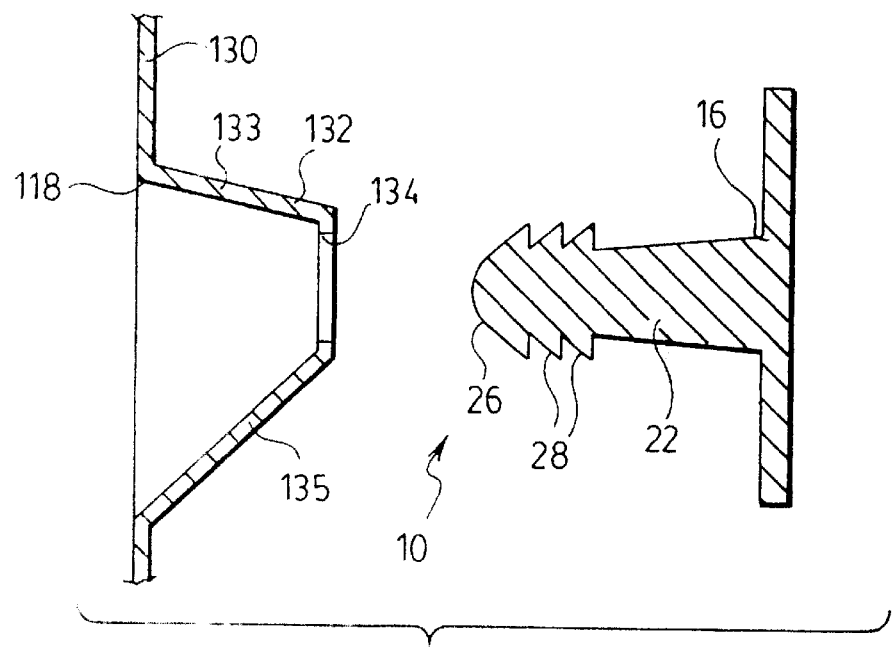
FIG. 5 is a side sectional view of another embodiment clip assembly of the present invention.

Referring to FIG. 5, an alternate embodiment of the base 118 is illustrated. The body 132 has side walls 133 and 135 which are tapered at different slopes. The recess 50 of the trim cover 12 is complementarily contoured. Thus, the base 118 may only be inserted into the recess 50 in one orientation. The mating face plate 16 can only be attached to the base 118 in one orientation relative to the base 118.

Figure 6:
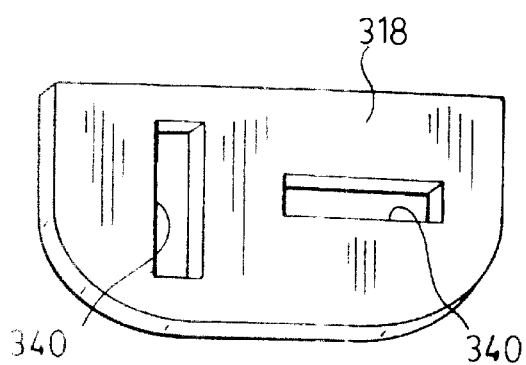
FIG. 6 is an alternative embodiment of the base.
Figure 7:
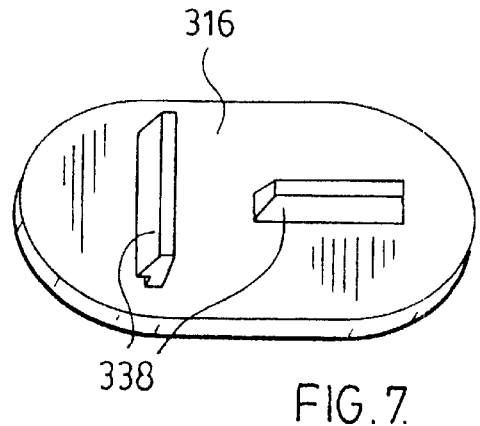
FIG. 7 is an alternative embodiments of the face plate complementary to the base of FIG. 6.

Referring to FIGS. 6 and 7, an alternative embodiment of the clip assembly 10 is shown which illustrates a different design of the posts 338 and apertures 340. Specifically, each of the posts 338 and corresponding apertures 340 have a rectangular configuration which are placed perpendicular to each other.

The preferred embodiment has been described in terms of at least two posts 22, 24. However, it is now apparent to those skilled in the art that the two posts could be integrated together to form a single post, provided the post enables the face plate 16 to be attached to the base 18 in only one orientation.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A clip assembly for presenting indicia on an interior panel of a vehicle, said clip assembly comprising:

a face plate having indicia thereon, said face plate having at least two barbed posts, a base having a contour which is asymmetrical in at least one direction, said base engagable with a complementarily shaped recess on said interior panel such that the base is received therein in only one orientation, said base having at least two complementary apertures receiving said posts, said apertures and said posts constructed and arranged such that the face plate engages said base through said interior panel in only one orientation relative thereto, enabling the face plate to be attached to the interior panel presenting said indicia in a predetermined orientation.

2. A clip assembly as claimed in claim 1 wherein said base has a body having an extent having an arcuate side and an opposite straight side.

3. A clip assembly as claimed in claim 2 wherein one of said posts has a circular cross section and the other of said posts has a rectangular cross section.

4. A clip assembly as claimed in claim 3 wherein said indicia is alphanumeric.

5. A clip assembly as claimed in claim 4 wherein said predetermined orientation is a readable orientation.

6. A clip assembly as claimed in claim 2 wherein said posts each has a rectangular cross section and said posts extend generally perpendicular to each other.

7. A clip assembly as claimed in claim 6 wherein said indicia is alphanumeric.

8. A clip assembly as claimed in claim 7 wherein said predetermined orientation is a readable orientation.

9. A clip assembly as claimed in claim 1 wherein said base has a body having asymmetrically tapered sides.

10. A clip assembly as claimed in claim 1 wherein one of said posts has a circular cross section and the other of said posts has a rectangular cross section.

11. A clip assembly as claimed in claim 1 wherein said indicia is alphanumeric.

12. A clip assembly as claimed in claim 1 wherein said predetermined orientation is a readable orientation.

13. A clip assembly as claimed in claim 10 wherein said posts each has a rectangular cross section and said posts extend generally perpendicular to each other.

14. A clip assembly as claimed in claim 13 wherein said indicia is alphanumeric.

15. A clip assembly as claimed in claim 13 wherein said predetermined orientation is a readable orientation.

* * * * *